Sept. 13, 1932.  L. C. FREEMAN ET AL  1,876,905
VEHICLE CONSTRUCTION
Filed April 5, 1930    11 Sheets-Sheet 1
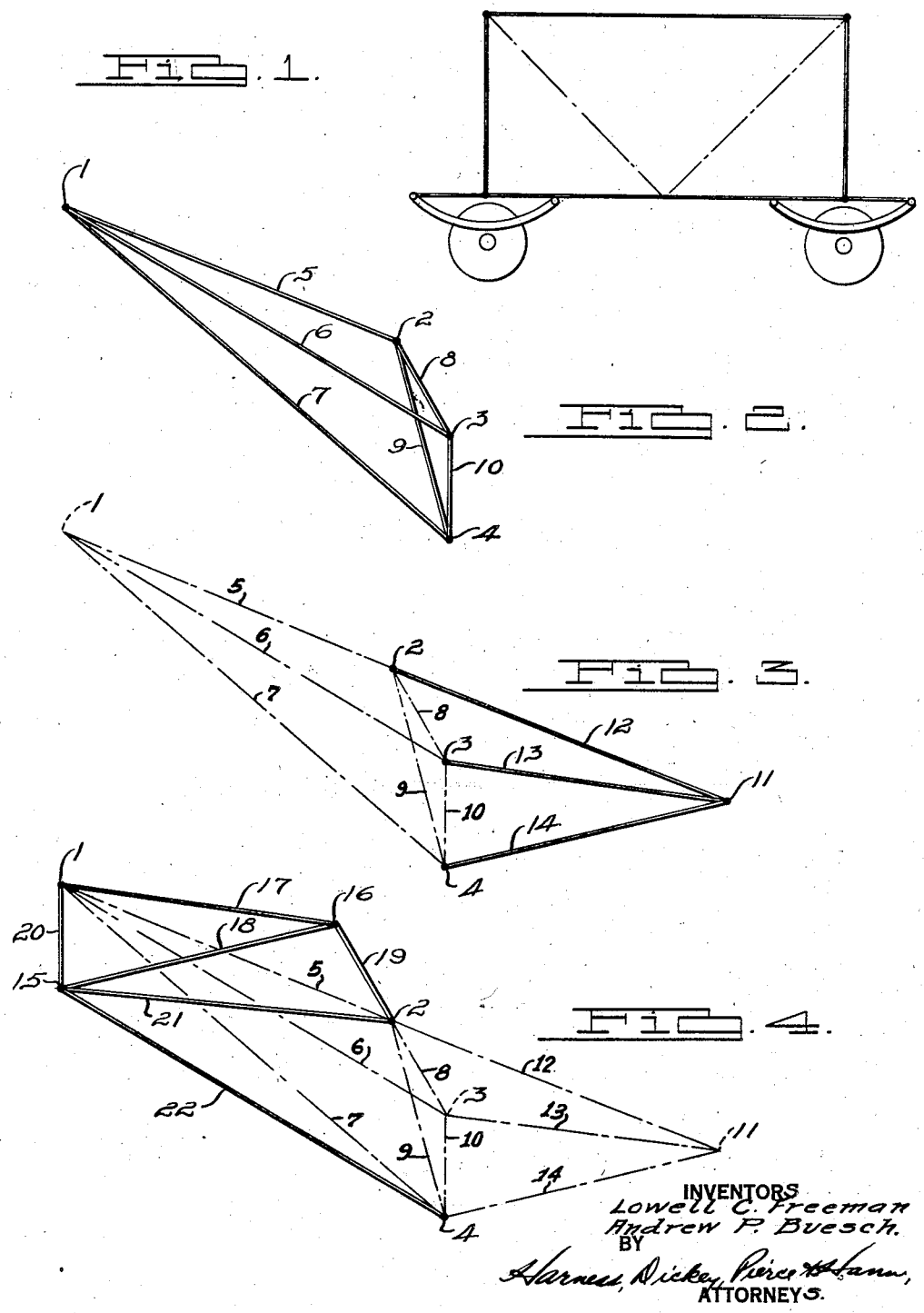
INVENTORS
Lowell C. Freeman
Andrew P. Buesch.
BY
Harness, Dickey, Pierce & Lane,
ATTORNEYS.

Sept. 13, 1932.  L. C. FREEMAN ET AL  1,876,905
VEHICLE CONSTRUCTION
Filed April 5, 1930   11 Sheets-Sheet 2

INVENTORS
Lowell C. Freeman
Andrew P. Buesch.
BY Harness, Dickey, Pierce & Haman
ATTORNEYS.

Sept. 13, 1932.   L. C. FREEMAN ET AL   1,876,905
VEHICLE CONSTRUCTION
Filed April 5, 1930   11 Sheets-Sheet 3

INVENTORS
Lowell C. Freeman
Andrew P. Buesch.
BY
Harness, Dickey, Pierce & Mann,
ATTORNEYS.

Sept. 13, 1932.  L. C. FREEMAN ET AL  1,876,905

VEHICLE CONSTRUCTION

Filed April 5, 1930   11 Sheets-Sheet 4

INVENTORS
Lowell C. Freeman
Andrew P. Buesch.
BY
Harness, Dickey, Pierce & Hann,
ATTORNEYS.

Sept. 13, 1932.  L. C. FREEMAN ET AL  1,876,905
VEHICLE CONSTRUCTION
Filed April 5, 1930  11 Sheets-Sheet 5
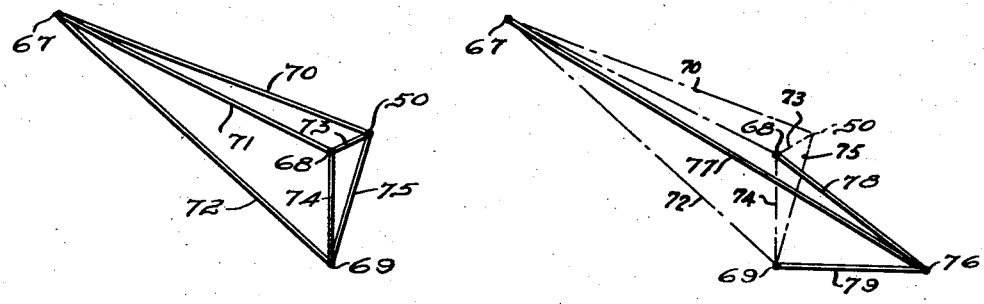
FIG. 11.  FIG. 12.
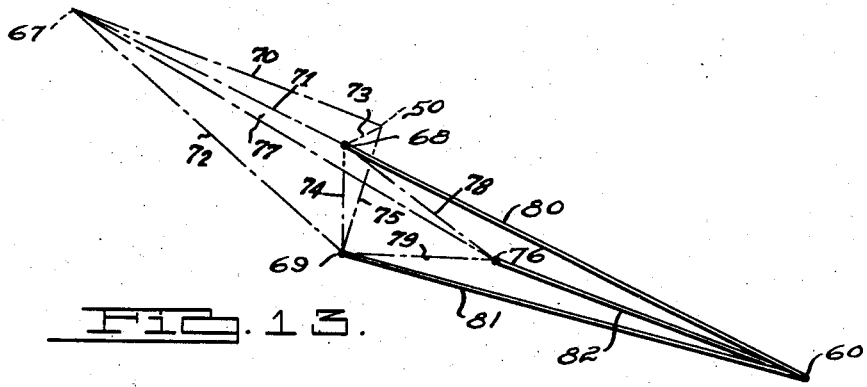
FIG. 13.
FIG. 14.
INVENTORS
Lowell C. Freeman
Andrew P. Buesch.
BY
Harness, Dickey, Pierce & Hann,
ATTORNEYS.

Sept. 13, 1932.   L. C. FREEMAN ET AL   1,876,905
VEHICLE CONSTRUCTION
Filed April 5, 1930   11 Sheets-Sheet 6
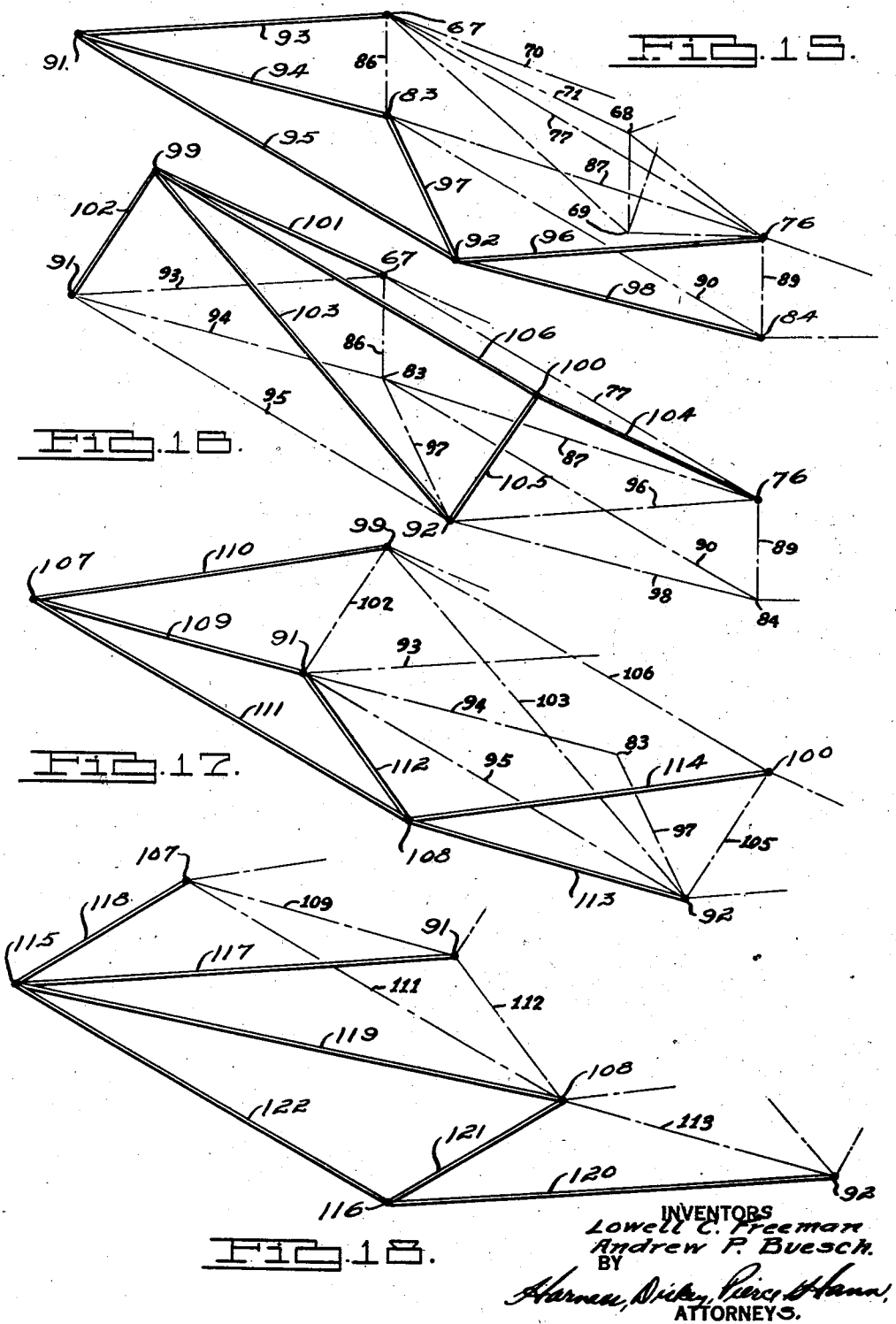

Sept. 13, 1932.  L. C. FREEMAN ET AL  1,876,905
VEHICLE CONSTRUCTION
Filed April 5, 1930  11 Sheets-Sheet 7
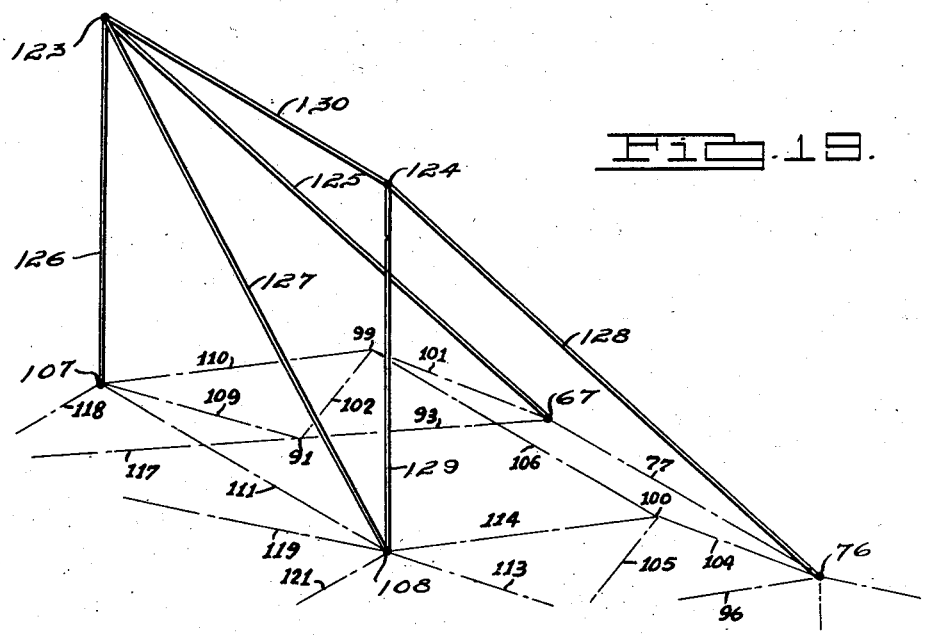
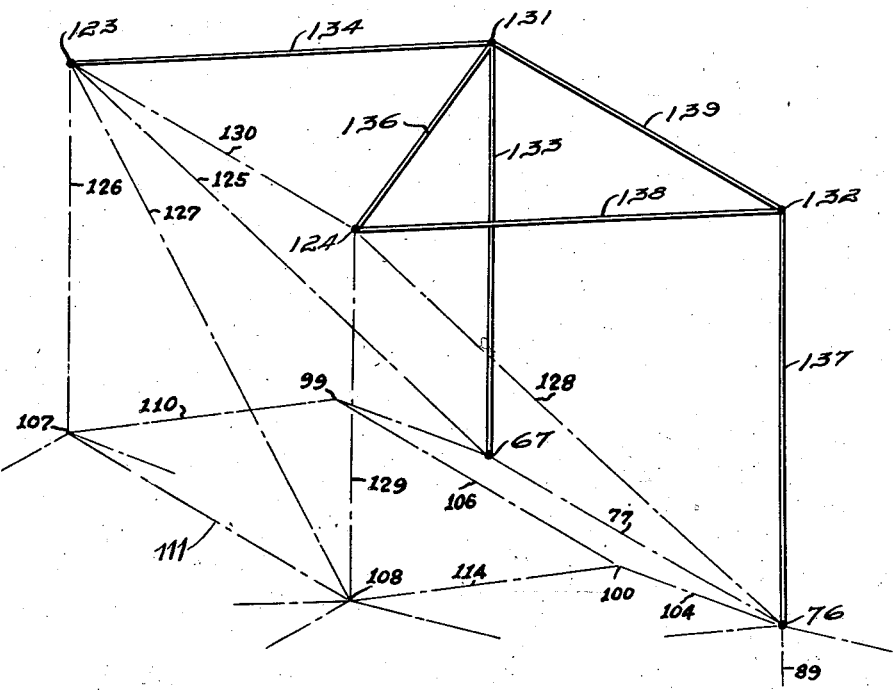
INVENTORS
Lowell C. Freeman
Andrew P. Buesch.
BY
ATTORNEYS.

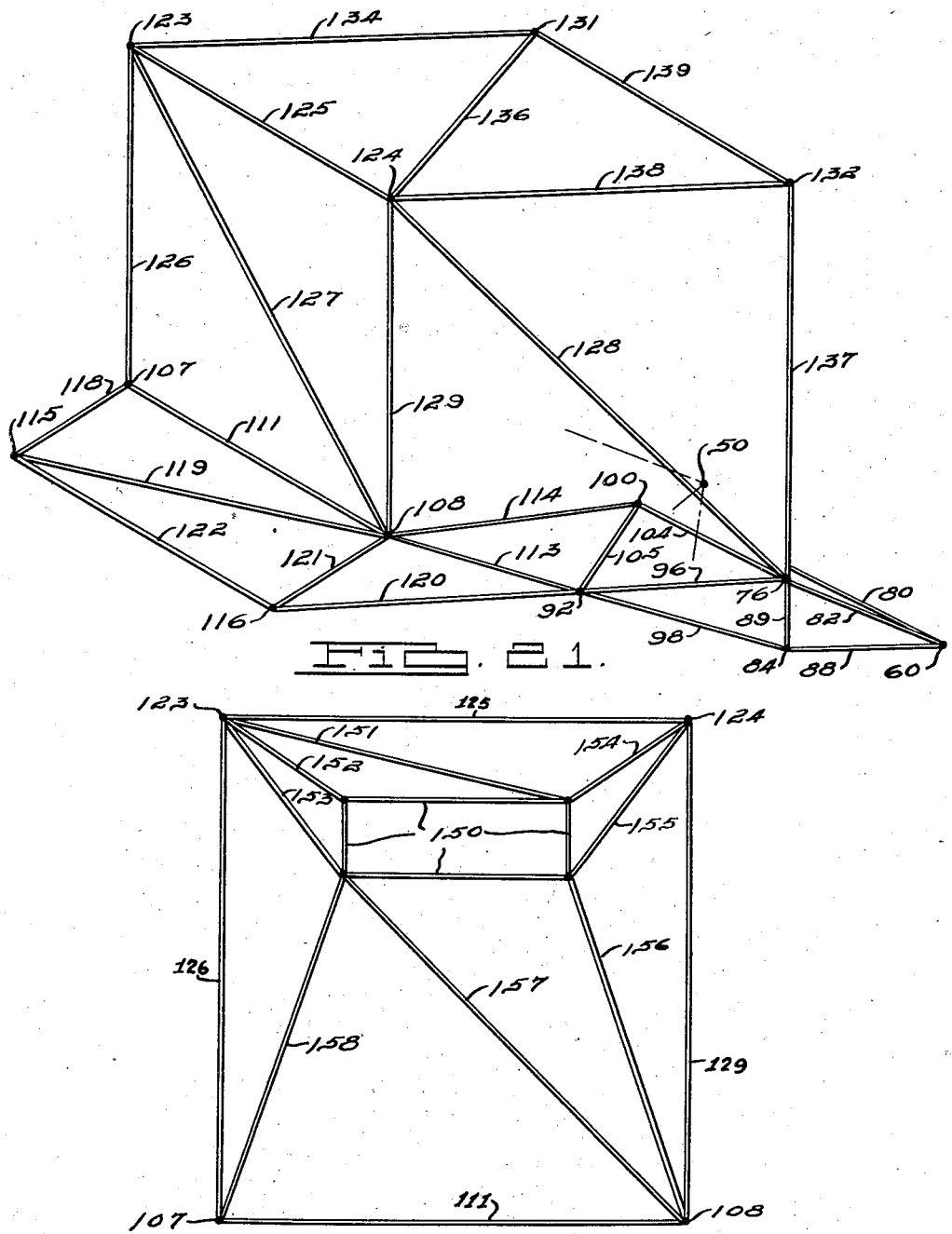

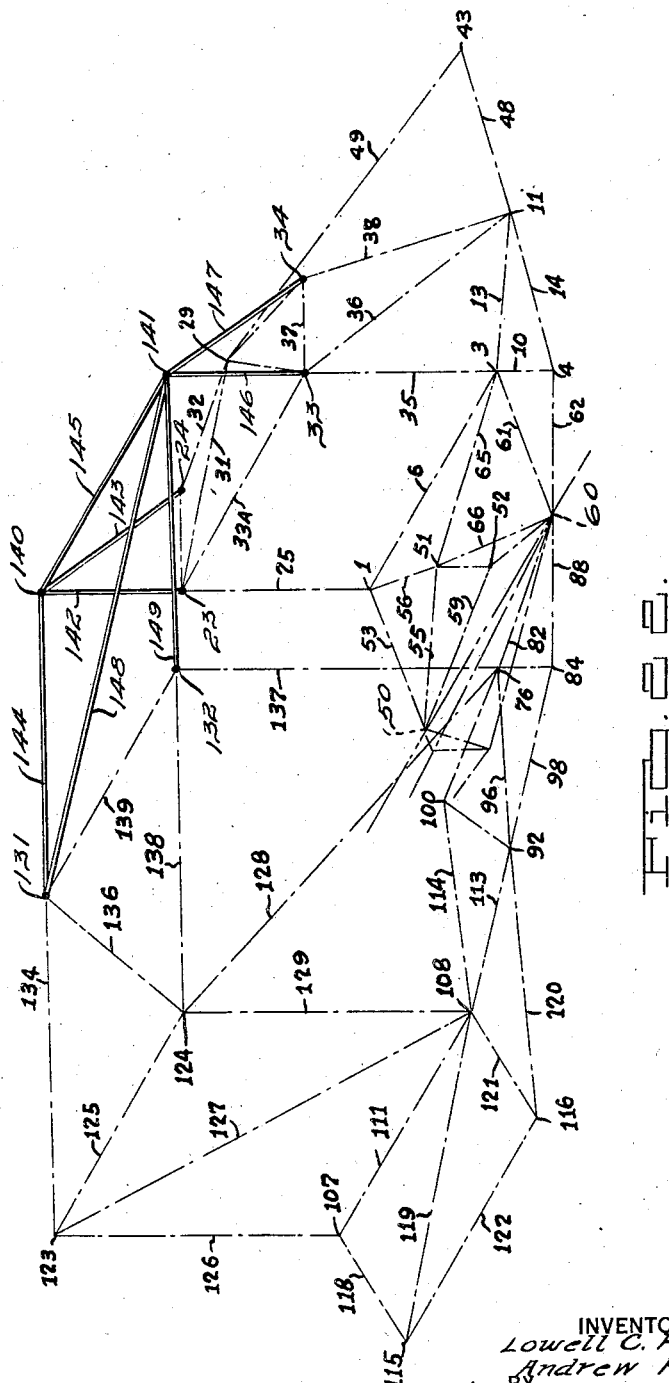

Sept. 13, 1932.  L. C. FREEMAN ET AL  1,876,905
VEHICLE CONSTRUCTION
Filed April 5, 1930    11 Sheets-Sheet 10
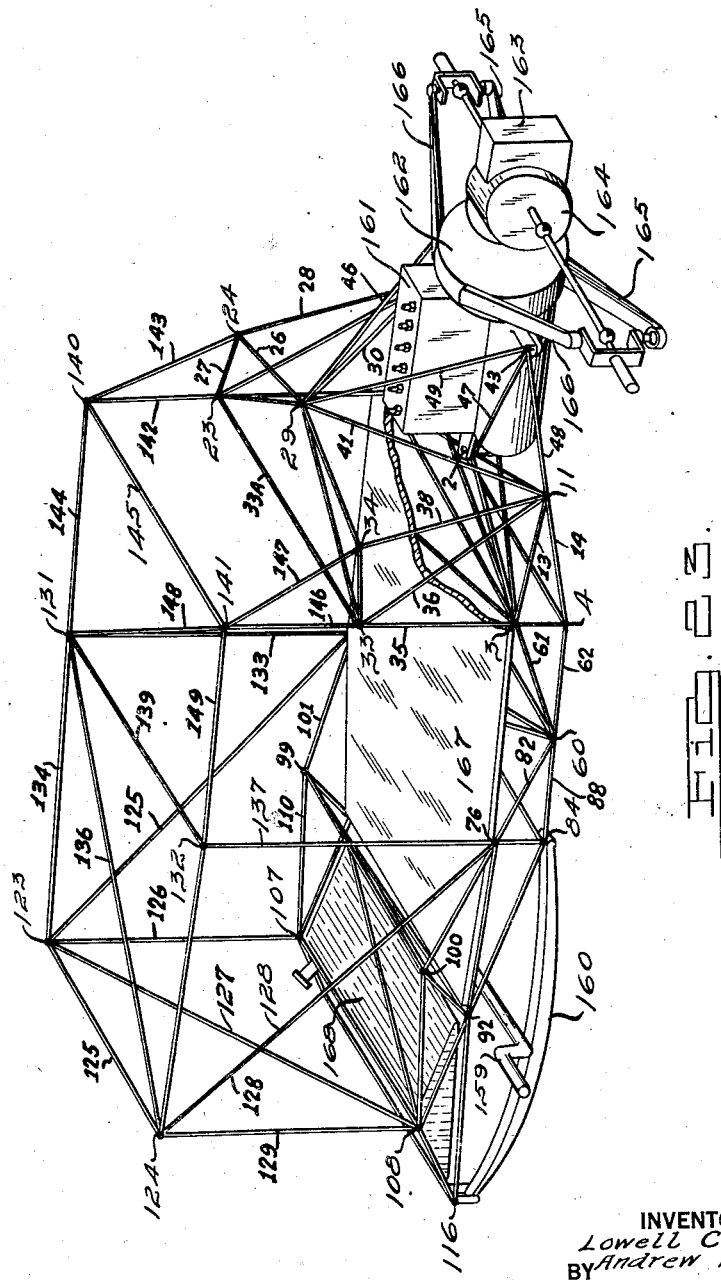
INVENTORS
Lowell C. Freeman.
Andrew P. Buesch.
BY
Harness, Dickey, Pierce & Hann,
ATTORNEYS.

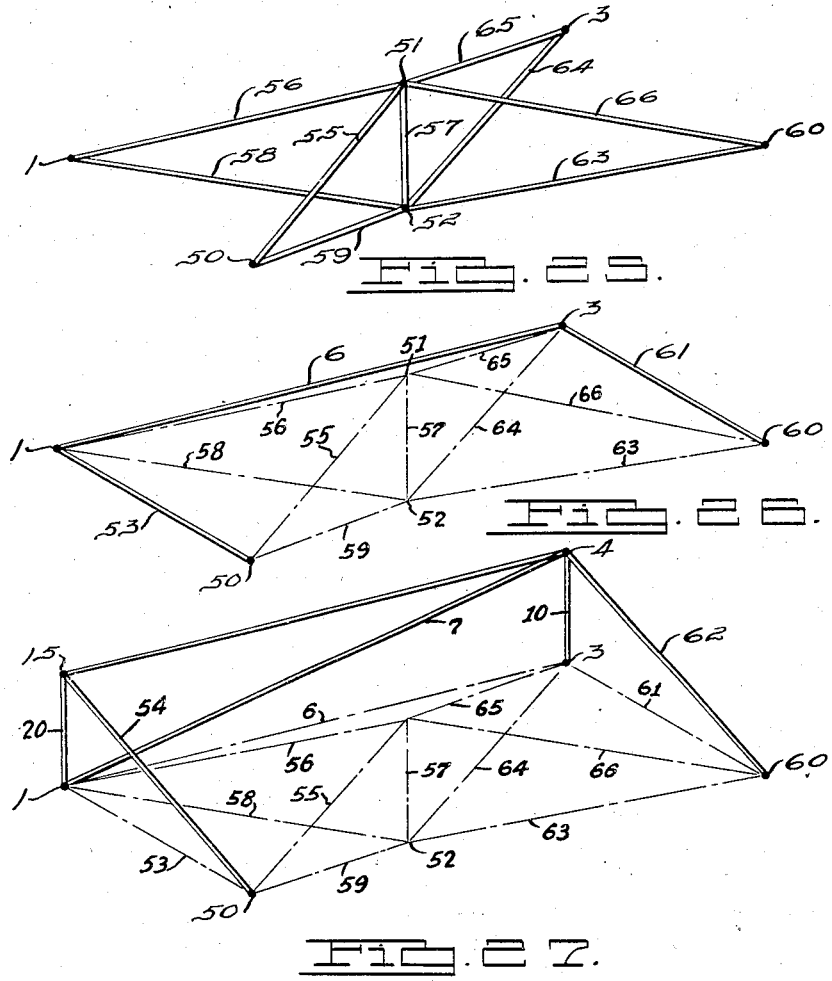

Patented Sept. 13, 1932

1,876,905

UNITED STATES PATENT OFFICE

LOWELL C. FREEMAN AND ANDREW P. BUESCH, OF DETROIT, MICHIGAN, ASSIGNORS TO RESENGIN, INC., A CORPORATION OF MICHIGAN

VEHICLE CONSTRUCTION

Application filed April 5, 1930. Serial No. 441,771.

This invention relates to an automobile body frame construction.

The main objects of this invention are to provide an improved construction of self-supporting body which will not require a chassis frame; to provide a construction which will materially reduce the total amount of material required in the construction of an automobile; to provide a construction which will lower substantially the cost of an automobile; to provide a self-supporting body construction in which rectangular openings for doors, windshield and rear window are secured; to provide an improved construction of statically determinate space units which will at least satisfy a theoretically correct formula; to provide a torsionally stiff space structure without diagonal brace members extending through the passenger carrying space; to provide an improved construction of self-supporting type which will permit a plurality of different body styles to be assembled to a standard power plant; and to provide a statically determinate space structure which can be incorporated into the body of a sedan automobile without destroying any or all of the limitations as to conventional openings, spaces, lines, etc. of the present day automobile, built in the conventional and accepted manner.

Having the broad and general object of economy in view, it is reasonable to assume that any attempt to materially reduce the cost of an automobile must be directed at a reduction in the total amount of material required. At the same time, it must be recognized that the present day automobile is the result of twenty-five years of experience, that its proportions have been determined by experience, and that no one is deliberately using more material than the present scheme of construction requires. Therefore, there would seem to be but little possibility of gain by a further whittling down of existing constructions.

The substitution of materials having lower specific weight than those now employed does not offer much, if anything, in the way of reduction of cost because of an unfavorable strength—cost ratio. For example, the use of aluminum—while it reduces the weight in general—increases cost as compared to steel or iron because while weight is reduced to one-third that of steel, the cost is five or six times as much.

Therefore, the existing constructions should be examined to see if all of the material employed is really working or whether some of it is simply getting a free ride. If the latter is found to be the case, then other constructions might conceivably be evolved to put to work this material which is now riding free.

Such seems to be the case as regards the body of the present day automobile. The weight of the finished body is from 30% to 35% of the total weight of the vehicle, with the cost in about the same proportion. It is generally conceded however that the body contributes little to the strength of the completed structure and that its principal function is to keep out wind and water. Therefore, if the body could be made a load carrying structure it is reasonable to expect that other parts now designed to carry loads could be materially reduced in size, or possibly dispensed with entirely.

Leaving this point for a moment, the first step in the visualization of such a body would be to picture its members arranged as in some form of truss to which it would seem that a closed body would readily lend itself. However, another practical difficulty here arises. It is necessary to keep approximately rectangular doors, and it is necessary to locate panel points where laterals can be passed through the body. The rectangular door opening requirement can be met by carrying some members of the truss below the floor line of the body, and panel points can be located where laterals can be passed through the body but in so doing the conception of a simple truss disappears and is replaced by a somewhat intricate and highly specialized truss form.

The carrying of the truss below the body floor line is made necessary by the unobstructed door opening requirement involving the location of panel points with their attendant laterals and diagonals below the floor line. These diagonals and laterals interfere badly with the load carrying and power transmitting parts required in the usual rear wheel drive. A drive to the front wheels concentrating—as it does—all of the power generating and transmitting machinery on the front end of the car, and permitting the use of a dead rear axle, eliminates this interference and makes possible the building of a satisfactory construction.

With the power generating and transmitting parts located forward of the dashboard, it becomes possible and reasonable to split the structure vertically at the dash and consider the front end as chassis and the rear end as body which results in the same degree of interchangeability as does the present horizontal division between the chassis and body and thus the first mentioned objection is answered.

The construction of a body in accordance with this conception requires far more than the construction of a statically determinate side truss. The thing we are considering is a space structure so that it must be properly trussed when looked at from either the ends, or the top or bottom, as well as when looked at from the sides. It is not permissible to pass diagonals through the passenger carrying compartment. It is not considered permissible to put diagonals in the windshield opening which therefore must be kept approximately rectangular without obstructions to vision. In addition, the structure must be torsionally stiff which, due to the prohibition of windshield diagonals, involves special torsion resisting constructions located elsewhere in the structure.

To sum up so far, this construction appears most feasible with the front wheel drive which leaves a space below the floor and above the ground clearance line unobsructed for the requisite lateral triangular bracing which cannot be done in the passenger carrying space, and also permits a vertical instead of horizontal separation of the chassis from the body, thus retaining the existing and highly essential characteristic of body interchangeability.

It seems possible to pass one lateral through the body just in front of and somewhat below the rear seat cushion without inconvenience to the passengers, and this has been taken advantage of.

The major steps in the location of the center lines of the requisite members with their attendant panel points have been: first, the development of a statically determinate co-planar side truss allowing rectangular door openings by carrying the truss below the floor line; second, the location of the panel points at the four corners of the windshield without the use of diagonals through the windshield opening; and third, the developing of a system of torsional bracing without diagonals through the passenger carrying space.

Another consideration that introduces some difficulties is the fact that the body—externally—cannot be a rectangular boxlike structure but is preferably built with curved surfaces, while the elements of the load carrying structure should be kept straight wherever possible to secure the maximum economy in the use of material. So far it appears that it is advisable, in order to avoid waste of space, to use certain curved members, for example, some of the roof diagonals and laterals.

The design of the members which are to occupy the positions indicated by the center lines is subject to rather wide modification in detail, but all of these members are contributing toward the support of the weight of the entire structure and loads carried thereby.

The attachment of the power plant to the body is on triangular pyramids with their bases approximately in the plane of the dash board, thus allowing convenient and easy separation.

We estimate that approximately 16% of the weight of the finished vehicle can be saved by the use of this construction, at the same time providing a much stronger and stiffer structure. Such stronger and stiffer structure is desirable in view of the fact that present day structures squeak and rattle after use on rough roads, and even after use on relatively smooth improved highways.

An illustrative embodiment of this invention is shown in the accompanying drawings, in which Fig. 1 is a diagrammatic view in side elevation of a closed body vehicle constructed on the principle of a Warren truss with the diagonal braces, which must be eliminated to provide for rectangular door openings, shown in dotted lines.

Fig. 2 is a diagrammatic view in perspective of a triangular pyramid which is the basic determinate space structure upon which this improved structure is built.

Figs. 3, 4, 5, 6, 8 and 9 are a series of diagrammatic views in perspective which show the addition of panel points and space structures, element by element, to form a statically determinate torsionally rigid front space structure.

Figures 5, 6:
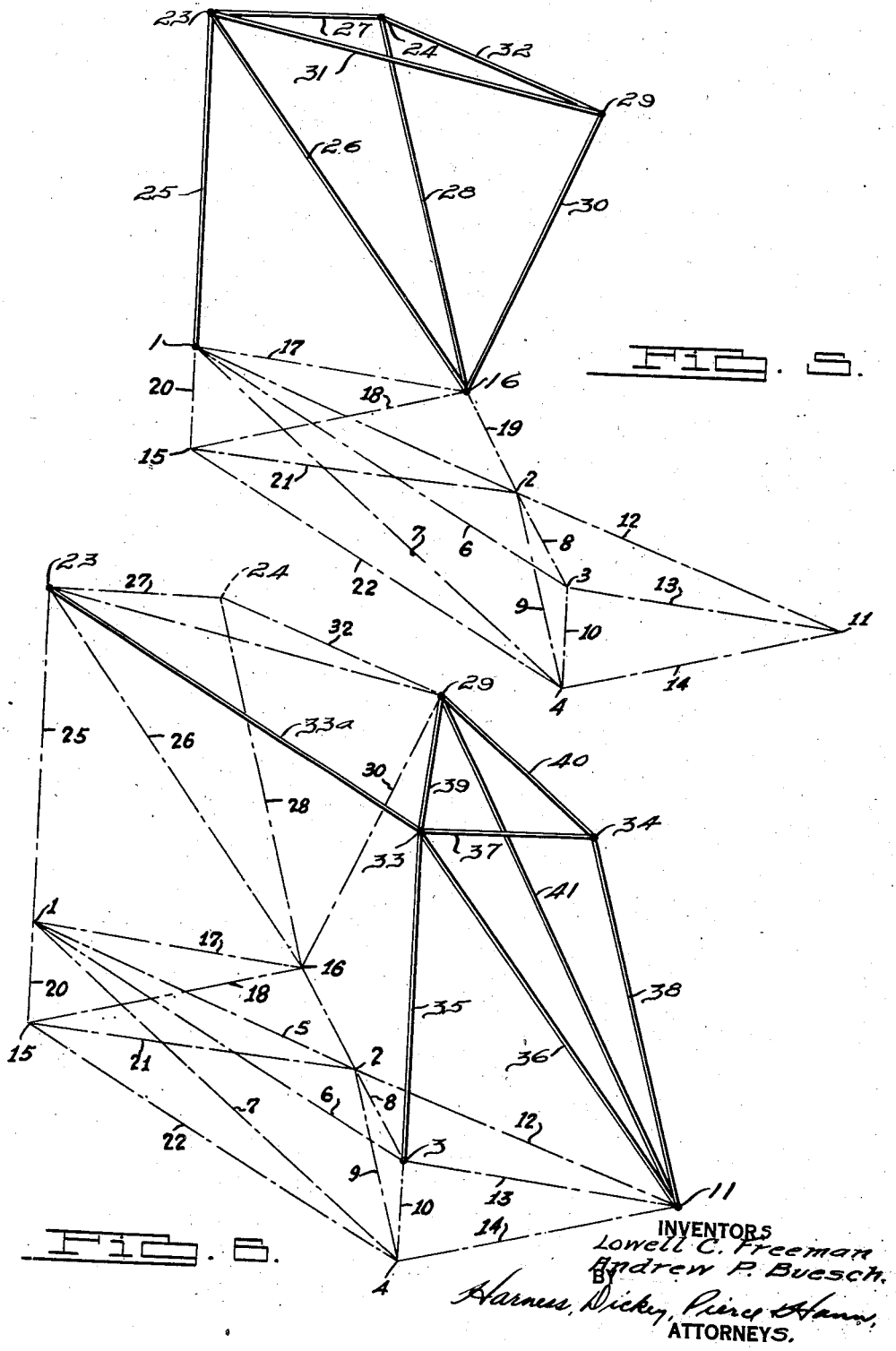
Figure 7:
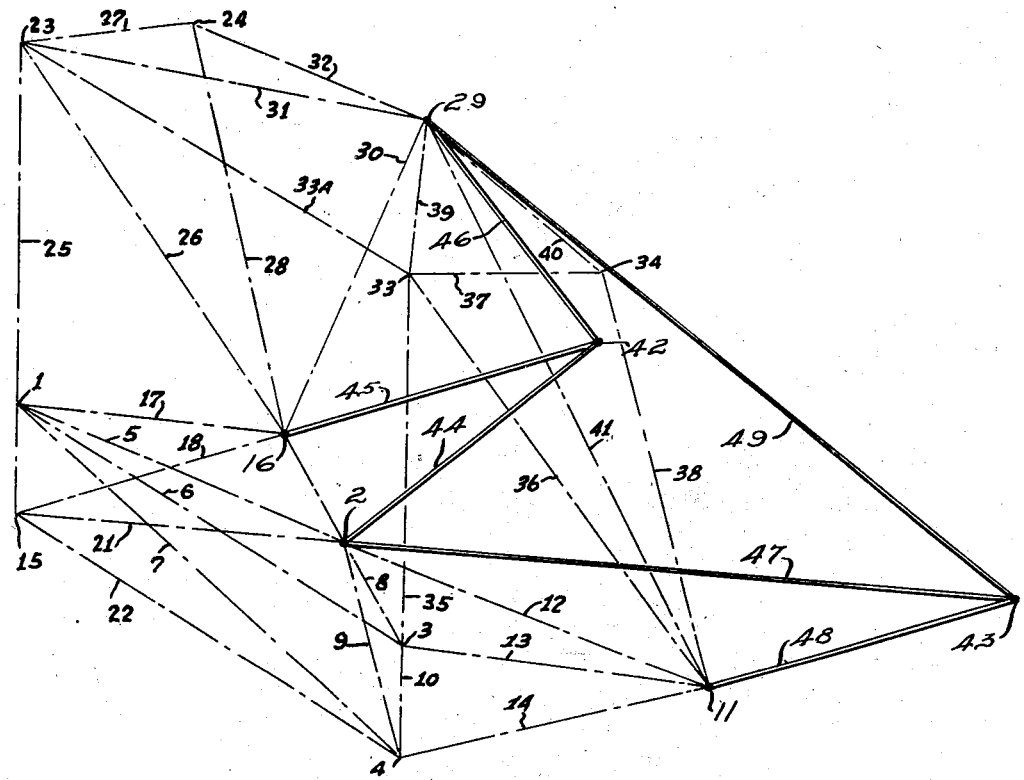
Fig. 7 is a diagrammatic view in perspective of the structure shown in Fig. 6 with the addition of two forwardly extending motor mounting panel points.
Figure 8:
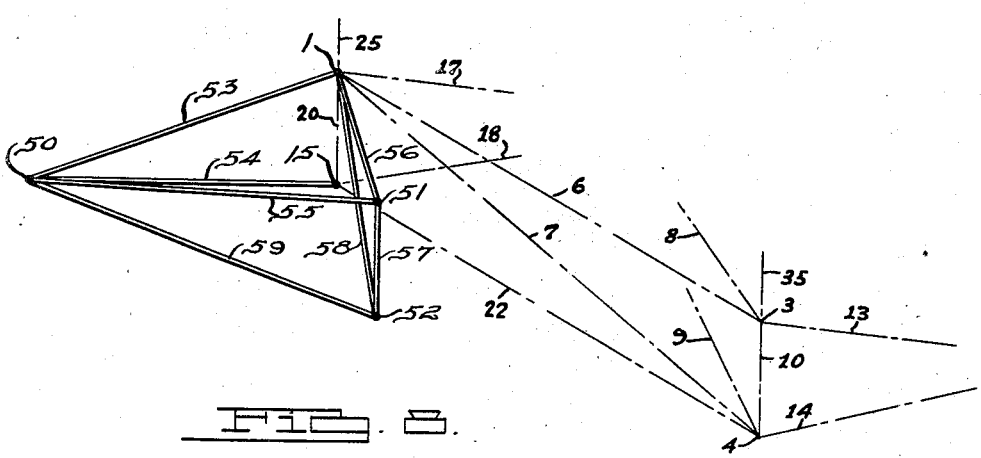

Figs. 11 to 20, inclusive, are diagrammatic views in perspective showing the addition of panel points and space units, element by element, which comprise the statically determinate torsionally rigid rear body frame structure which extends along the roof, down the back and forwardly along the floor of the vehicle body.

Fig. 21 is a diagrammatic view in perspective of the rear structure formed by the elements shown in Figs. 11 to 20, inclusive, and shown as though the exterior members defined a solid opaque structure.

Fig. 22 is a diagrammatic view in perspective of the front structure joined to the rear structure so as to have one degree of freedom and with the addition of the necessary roof compression members or struts and windshield frame members for restraining the two structures from relative movement.

Fig. 23 is a diagrammatic view in perspective of the complete body frame with a front wheel drive motor unit mounted therein.

Fig. 24 is a plan view of a modified form of back panel for the body frame which provides a rectangular window frame mounted so as to be statically determinate in its own plane.

Figs. 25 to 27, inclusive, are diagrammatic views in perspective showing the development of the statically determinate, torsionally rigid space structure.

Before entering upon a detailed description of the construction shown in the drawings and in order that there shall be no confusion due to the misconception of terms and nomenclature used in the following specification claims, the various terms and expressions used will be defined and explained.

The usual text book definition of a determinate structure is one in which the reactions of the structure and the loads in the component parts thereof may be calculated by the principles or methods of statics. In accordance with the above definition, a structure which has redundant members therein becomes indeterminate.

Now, contrary to the foregoing, we, in the use of the expression "statically determinate" throughout the specification and claims wish it distinctly understood that this expression shall mean, cover and include a structure which is not only statically determinate in the usual sense of the word but also a structure having a redundant member or members therein, which, if removed, would leave a stable statically determinate structure.

In order to differentiate between a determinate structure which has had a redundant member or members added thereto and one which is truly determinate as defined by the usual text book rule, this latter truly determinate structure will be hereinafter referred to as a "perfect statically determinate" structure.

There are two types of perfect determinate structures, viz: structures which lie in one plane only and are termed "statically determinate co-planar" structures, and secondly, structures which occupy three dimensional spaces and are termed "statically determinate space" structures.

In the invention which we are dealing with herein, we are primarily concerned with space structures, although many of the improved features which we have worked out and developed herein may be applied with advantage to co-planar structures.

As to the theory of the co-planar structure, the simplest form is the plane triangle and if we let P equal the number of points joined in such a structure and N the number of members necessary to join the points, the following equation can be used to investigate the determinacy of the structure: $N = (2P-3)$.

The simplest and basic perfect determinate space structure is a plane triangle with a point removed from the plane of such triangle and joined thereto by three members so as to constitute a triangular pyramid.

The following equation can be used to investigate the determinacy of such a space structure when, as before, P equals the number of points joined and N the number of members necessary to join the points: $N = (3P-6)$.

As is well understood the members joining the points in a perfect determinate structure must have pin connected or universal joints at the points of attachment to adjacent members. This assures that the loads or forces transmitted to the various members, whether tension or compression, as the case may be, will be axial loads, otherwise termed longitudinal stresses only. However, when incorporating this improved invention into a vehicle body such as an automobile, it is probably more practicable to make the points of juncture rigid, but the proportions of materials are so calculated that the secondary stresses to which the members are subjected are relatively small. It is to be clearly understood that throughout the specification and claims, where the expression "statically determinate" is used, it is also meant to encompass and include a structure fabricated with either pin joints or rigid connections.

Furthermore, it may be advantageous in certain instances to use curved members or beams in place of straight members. Where this is done the strength of the curved member is preferably calculated so that its deformation will be substantially equal to or less than that of a straight member when both are subjected to equal loads. Hereinafter in the specification and claims it is further definitely intended that the terms "determinate" or "statically determinate" shall also include, cover and encompass structures using curved members as hereinabove described.

There is another relation which exists in the theory of space structures. After a determinate space unit is formed, such as a triangular pyramid, the addition of one point requires the use of three members, therefore, the equation N equals 3P can be used for the addition of points to a basic determinate space unit.

The foregoing general rules and laws governing perfect statically determinate structures which are sometimes termed "just rigid" structures are, in general, true for all conditions except in those structures which, owing to some special relation between the links of the members, the frame admits of an infinitesimal deformation due to its "critical form".

The simplest case is that of a frame of three bars where the three joints A, B and C fall into a straight line. A small displacement of the joint B at right angles to A, C would involve changes in the links A, B, B, C, which are only of the second order of small quantities. Other arrangements are possible where this same condition exists. The result may be generalized into the statement that a frame has a critical form whenever a frame of the same structure can be designed with corresponding bars parallel, but without complete geometric similarity. Such a condition is equally true of three dimensional frames which satisfy the equation 3P−6 for the number of bars or members constituting the frame. Such frames if arranged in "critical form" are not statically determinate.

Where more than one system of resistances are alike capable of balancing the same system of loads applied to a given structure, the smallest of these alternative systems is that which will actually be exerted—because the resistances to displacement are the effect of a strained state of the members, which strained state is the effect of the load, and when a load is applied the strained state and the resistances produced by the strained state increase, until the resistances acquire just those magnitudes which are sufficient to balance the load after which they increase no further.

This principle of least resistances renders determinate many problems in the statics of structures which were formerly considered indeterminate.

After the arrangement of the members of a structure and the size and figure of their joints or surfaces of contact have been determined so as to fulfill the conditions of stability,—conditions which depend mainly on the position and direction of the resultant or total load on each piece, and the relative magnitude of the loads on the different pieces—the dimensions of each piece singly have to be adjusted so as to fulfill the conditions of stiffness and strength—conditions which depend not only on the absolute magnitude of the load on each piece, and of the resistances by which it is balanced, but also on the mode of distribution of the load over the piece, and of the resistance of the joints.

The effect of the pressures applied to a member, consisting of the load and the supporting resistance, is to force the member into a state of strain or disfigurement which increases until the elasticity or resistance of the material to the strain causes it to exert a stress or effort to recover its figure, equal and opposite to the system of applied pressures. The condition of stiffness is that the strain or disfigurement shall not be greater than is consistent with the purposes of the structure; and the condition of strength is that the stress shall be within the limits of that which the material can bear.

In building up this structure unit by unit, we will first construct a triangular pyramid as shown in Fig. 2 which has four points 1, 2, 3 and 4 joined by members 5, 6, 7, 8, 9 and 10.

Going now to the formula for a basic determinate space unit, we find that 3P, which in this case is 12, minus six equals six, or the required number of members to make a perfect statically determinate structure. Thus we see the equation has been satisfied by the connection of the four points with the six members.

To this basic determinate space unit we now wish to add an additional point 11. This point is connected by three members 12, 13 and 14. Referring now to the second equation of N=3P, we find that by connecting the point 11 with the three members we have satisfied the equation. Thus the two points 1 and 11 are connected to each other by a statically determinate structure so that one of the points cannot be displaced relative to the other except by deformation of the material by which they are connected.

Considering the points 3, 4 and 11 as panel points on one side of a body frame construction, which provide a triangular shaped side panel defined by the members joining these points, we now construct a similar structure on the opposite side of the body frame, i. e., the same side as the point 1. In order to have symmetrical panel points in corresponding relationship, we will now add the panel points 15 and 16. Applying the equation for adding points to a basic determinate space unit, we connect the point 16 to the points 1, 15 and 2 by members 17, 18 and 19 and the point 15 to the points 1, 2 and 4 by members 20, 21 and 22, respectively. Thus we have a symmetrical statically determinate space unit which has triangular panels in spaced substantial parallel relationship to each other and disposed at opposite sides of the vehicle body frame. This unit provides a rear engine mounting and a structure upon which to erect the cowl unit of the vehicle body including the lower boundary of the windshield.

Spaced above the panel points 1 and 16, we select two panel points 23 and 24, which are located at the top of the cowl along one side edge of the body frame construction. The point 23 is connected to the point 1 by a member 25 and to the point 16 by member 26. The panel point 24 is connected to the panel point 23 by a member 27 and to the panel point 16 by a member 28. We now select a point at substantially the middle part of the front edge of the cowl, in other words, at the point where the middle of the top edge of the dash would normally come. The point 29, as shown, is slightly forward of the panel point 24. The panel point 29 is connected to the panel points 16, 23 and 24 by members 30, 31 and 32, as shown in Fig. 5 of the drawings.

Referring to Fig. 6 of the drawings, we select a pair of panel points 33 and 34 which correspond to the panel points 23 and 24 but located at the opposite side of the cowl. The panel point 33 is connected to the panel points 3 and 11 by members 35 and 36, respectively. The panel point 34 is connected to the panel points 33 and 11 by members 37 and 38 respectively. The panel points 33, 34 and 11 are now connected to the panel point 29 by members 39, 40 and 41 respectively.

Going back now to the matter of satisfying the equation it is seen that we have added five panel points 23, 24, 29, 33 and 34 to the basic determinate space structure shown in Fig. 4. Five panel points require fifteen members and now by connecting the panel point 33 to the panel point 23 by a member 33a we find that fifteen members have been added to the basic determinate space structure shown in Fig. 4, thus satisfying the equation.

It is now desired to complete the motor mounting so as to give a three point suspension to the unit. The panel point 2 being at the lower medial front side of the cowl structure will serve as a rear motor mounting and two additional panel points 42 and 43 are now added, one at each side of the cowl and in advance thereof. The panel point or left motor mounting 42 is connected to the panel points 2, 16 and 29 by members 44, 45 and 46, respectively. Panel point 43, which is a right-hand front motor mounting, is connected to the panel points 2, 11 and 29 by the members 47, 48 and 49 respectively. Two points have thus been added to a basic determinate space structure and the equation has been satisfied by the provision of six members for these connections.

It is now desired to extend the structure rearwardly along the floor line and in this unit we desire to provide not only a statically determinate structure but also one which is torsionally rigid by reason of the arrangement of statically determinate sub-units therein.

Due to the slenderness or vertical depth of the units which extend along the floor of the vehicle body as compared to their horizontal dimensions, they sufficiently approach the critical condition as to cause them to be torsionally weak.

Therefore, it has been necessary to evolve a special torsionally rigid unit, which in the embodiment shown, has one redundant member and is therefore indeterminate within the strict text-book rule as laid down for determinate structures.

First we will take a panel point 50 located rearwardly of the cowl structure and in line with the side of the body frame. Two other points 51 and 52 are selected which are substantially in vertically spaced relation at the medial longitudinal center line of the structure and spaced rearwardly from the cowl half the distance of the point 50. The point 50 is joined to the panel points 1, 15 and 51 by members 53, 54 and 55 respectively. The panel point 51 is joined to the points 1 and 52 by members 56 and 57, respectively. The point 52 is joined to the points 1 and 50 by members 58 and 59 respectively.

We now select a panel point 60 at the opposite side of the body frame construction in the same relative position as the panel point 50 and join it to the panel points 3, 4 and 52 by members 61, 62, 63 respectively. The panel point 52 is also joined to the panel point 3 by a member 64 and the panel point 51 is joined to the panel points 3 and 60 by members 65 and 66 respectively.

Figure 9:
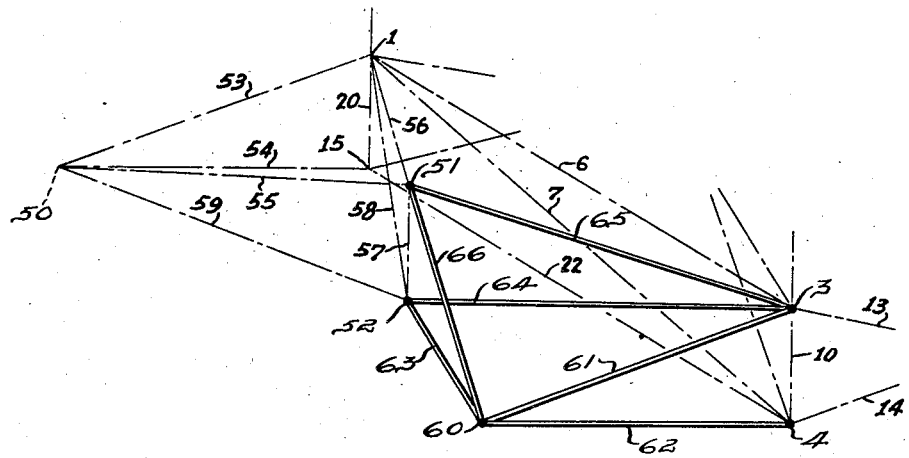
Figure 10:
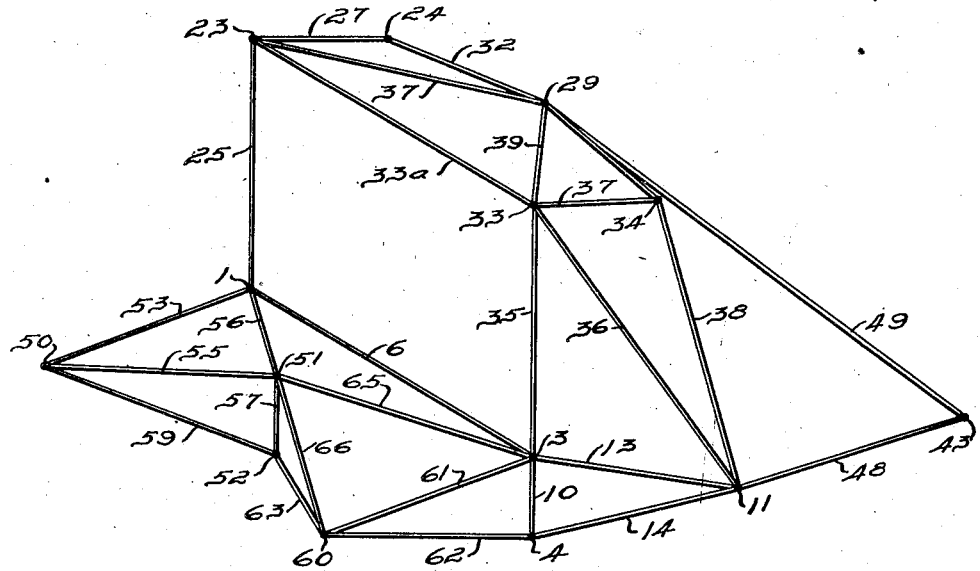
Fig. 10 is a diagrammatic view in perspective of the complete statically determinate torsionally rigid front space structure which extends from the cowl downwardly along the dash and rearwardly under the floor of the vehicle body, and shown as though the exterior members defined a solid opaque structure.

We have now added four panel points 50, 51, 52 and 60 to our basic determinate cowl structure. Applying the equation it is seen that four points require twelve members and, as shown in Fig. 9 of the drawings, and from the foregoing description, it is seen that we have present thirteen members. This means that one member is redundant, such for instance, as the member 62.

The structure so far fabricated completes what we hereinafter term the front rigid statically determinate torsionally braced structure. On the outer sides its presents a number of triangular panels which are not only rigid in their own plane but statically determinate in their own plane, the structure as a whole being rigid and statically determinate in vertical longitudinal, vertical transverse, and horizontal planes.

The structure is caused to be torsionally rigid or resistant by reason of the unit comprising members 55, 56, 57, 58, 59, 63, 64, 65 and 66, best illustrated in Fig. 25. These members form in reality a pair of transversely disposed king post trusses having a common king post, each of the trusses having its ends anchored at opposite sides of the vehicle body frame. Considering this torsion resisting unit as a series of space elements, it is seen that a pair of triangular pyramids are joined along one base edge. By connecting the outer ends, the structure then becomes statically determinate in all planes. The development of this torsion resisting unit as a separate and distinct element is shown most clearly in Figs. 25, 26 and 27.

Leaving for the present the front structure, we take up the fabrication of a rear structure which extends along the rear portion of the vehicle body frame floor, upwardly at the back, and forwardly along the roof. This rear structure is connected to the front structure, however, at the two rearwardly extending panel points 50 and 60.

Referring to Fig. 11, we locate a panel point 67 rearwardly of the panel point 50 along the left side of the vehicle body frame and locate a pair of panel points 68 and 69 medially of the panel points 50 and 67 but positioned inwardly in substantially the plane of the center line of the body frame. The panel point 67 is joined to the panel points 50, 68 and 69 by members 70, 71 and 72 respectively. The panel point 68 is connected to the panel points 50 and 69 by members 73 and 74 respectively, and the panel point 69 is connected to the panel point 50 by a member 75. We now have a statically determinate space structure in the form of a triangular pyramid.

Referring to Fig. 12, we now locate a panel point 76 which is in the general plane of the right side of the body frame in the same relative position and corresponding to the panel point 67 at the left side of the body frame. The panel point 76 is connected to the panel points 67, 68 and 69 by members 77, 78 and 79, respectively. Referring to the equation, we find that it is now satisfied by the use of three members to add one point to a basic determinate space structure.

The structure so far built up, as shown in Figs. 11 and 12, is now connected to the panel point 60, as shown in Fig. 13. Members 80, 81 and 82 connect the panel point 60 with the panel points 68, 69 and 76, respectively. We have now formed a statically determinate torsionally rigid unit upon which the rear structure is built. This unit also has one redundant member, as explained in connection with the similar unit heretofore described.

Referring to Fig. 14, we add two panel points 83 and 84 in vertically spaced relation below the panel points 67 and 76, respectively. The panel point 83 is connected to the panel points 50, 67 and 76 by members 85, 86 and 87, respectively. The panel point 84 is connected to the panel points 60, 76 and 83 by members 88, 89 and 90, respectively. In accordance with the equation, six members are necessary for the addition of two panel points to the basic determinate space structure and it is seen that the equation is thus satisfied.

Referring now to Fig. 15, we select two panel points 91 and 92 spaced rearwardly from the structure so far fabricated and in a general plane of the opposite sides of the body frame structure. The panel point 91 is connected to the panel points 67, 83 and 92 by members 93, 94 and 95, respectively, and the panel point 92 is connected to the panel points 76, 83 and 84 by members 96, 97 and 98, respectively. Two panel points having been added by the use of six members, the equation is satisfied.

Referring now to Fig. 16, we select two panel points 99 and 100 located in vertically spaced relation above and slightly forward of the panel points 91 and 92, respectively. The panel point 99 is connected to the panel points 67, 91 and 92 by members 101, 102 and 103, respectively. The panel point 100 is connected to the panel points 76, 92 and 99 by members 104, 105 and 106, respectively. This structure also satisfies the equation by the use of six members to add two points to the basic determinate space structure.

Referring now to Fig. 17, we select two panel points 107 and 108 which are located rearwardly from the preceding structure and substantially in a plane of the sides of the body frame. The panel point 107 is connected to the panel points 91, 99 and 108 by members 109, 110 and 111, respectively. The panel point 108 is connected to the panel points 91, 92 and 100 by members 112, 113 and 114, respectively. Two points have been added by the use of six members and the equation thus satisfied.

Referring to Fig. 18, we select two panel points 115 and 116 located rearwardly of the preceding structure and substantially in a plane of the opposite sides of the body frame structure. The panel point 115 is connected to the panel points 91, 107 and 108 by members 117, 118 and 119, respectively. The panel point 116 is connected to the panel points 92, 108 and 115 by members 120, 121 and 122, respectively. Again the equation has been satisfied by the use of six members for adding two points to a basic determinate structure.

Referring to Fig. 19, we now select two panel points 123 and 124, which are vertically spaced above the panel points 107 and 108, respectively, and locate them at the points where the top rear corners of the body frame structure are desired to be. The panel point 123 is connected to the panel point 67, 107 and 108 by members 125, 126 and 127, respectively. The panel point 124 is connected to the panel points 76, 108 and 123 by members 128, 129 and 130, respectively. This provides the upwardly extending back structure for the vehicle body frame.

Referring now to Fig. 20, we select two panel points 131 and 132 which are located forwardly of the rear edge of the roof and along opposite sides thereof. These points are preferably in substantially vertical spaced relation to the panel points 67 and 76, respectively, so that when connected thereto, they will define the rear side of the door frame for the vehicle body. The panel point 131 is joined to the panel points 67, 123 and 124 by members 133, 134 and 136, respectively. The panel point 132 is joined to the panel points 76, 124 and 131 by members 137, 138 and 139, respectively. Two panel points having now been added by the addition of six members, the equation is satisfied.

Referring now to Fig. 21, it is seen that we have fabricated a statically determinate torsionally rigid rear body frame space unit which has a plurality of triangular panels in its sides and which extends rearwardly along the floor, upwardly at the back and forwardly along the roof. This rear structure is joined to the front structure at the panel points 50 and 60 and these points of connection between the front unit and rear unit may be pin connections so as to permit one degree of freedom between the two units.

By the term "one degree of freedom" is meant a construction in which two members are connected so as to have pivotal movement relative to each other in one plane only. A connection which permits pivotal movement in two planes is designated as having "two degrees of freedom", and one which permits relative movement in any plane, such as a ball and socket joint, is designated as having "three degrees of freedom".

The front unit is supported generally by the front wheels of the vehicle and the rear unit by the rear wheels. Having the front and rear units, the problem now becomes one of placing roof and windshield frame members so as to restrain the front and rear structures from movement relative to each other about an axis through the panel points 50 and 60.

Referring now to Fig. 22, we select panel points 140 and 141 which are at the front top edge of the roof and thus at the top edges of what will become the windshield frame. The panel point 140 is connected to the panel points 23, 24, 131 and 141 by members 142, 143, 144 and 145, respectively. The panel point 141 is connected to the panel points 33, 34, 131 and 132 by members 146, 147, 148 and 149, respectively. By referring to the equation it is seen that more members have been added for these two panel points than required for a perfect statically determinate space structure but due to the fact that we wish to have roof supporting and boundary members and also to equalize the torsional strain on the right and left sides of the vehicle body frame, these additional redundant members have been used although not strictly required from a theoretical standpoint. Under normal conditions of loading in the usual position of a vehicle body frame, the members 144, 148 and 149 are compression members, although in actual practice, these members, as well as any or all of the other members in the vehicle body frame may be made as struts to take both tension and compression. The members 142, 143, 146 and 147 which extend downwardly from the panel points 140 and 141 to join with the top edge of the cowl structure define triangular panels which are rigid in their own plane and thus rigid in a vertical longitudinal plane with respect to the entire structure.

The entire structure as now fabricated and completed has thirty-eight panel points. By referring to the equation, it is seen that one hundred and eight members are required for this number of panel points to make a perfect statically determinate space structure. Due to the three redundant members hereinbefore referred to, there are present in the structure one hundred and eleven members. Thus it is seen that the structure satisfies the equation and has in addition thereto three redundant members.

Referring to Fig. 24 of the drawings there is shown a modified form of back panel for the vehicle body frame which provides a rectangular rear window opening within the rectangular framework, which defines the rear end of the body frame. This rectangular frame 150 is connected to the panel point 123 by members 151, 152 and 153; to the panel point 124 are members 154 and 155; to the panel point 108 by members 156 and 157 and to the panel point 107 by a member 158. This modified form of back structure, if incorporated into the general structure hereinbefore described would destroy its determinacy, but by making the various members thereof in the form of beams with sufficient strength such a structure may be successfully incorporated into the vehicle body frame as outlined.

In the use of this body frame construction, a rear axle 159 may be connected to the rear framework at the panel points 84, 116, 83 and 115, by a pair of semi-elliptic springs 160, only one of which is shown in the drawings.

The front end of the vehicle body frame is provided with a power unit, such as an internal combustion engine 161, flywheel and clutch housing 162, transmission gear case 163 and differential housing 164, all these units being integrally connected together as is customary in front wheel drive constructions. This power unit is connected at its rear end to the panel point 2 and at points adjacent the front end of the internal combustion motor at the panel points 42 and 43. These front points of attachment are preferably in substantially the same transverse vertical plane as the point of attachment of the springs 165 and 166 so that the torsional strain between the motor and the vehicle body frame will be substantially co-planar with respect to the points of application.

A particular feature of this type of construction is the manner in which it lends itself particularly to a front wheel drive. By elimination of the usual propeller shaft extending to the rear axle, the framework below the floor-boards 167 may be formed of a series of trusses which would be practically prohibitive if the propeller shaft was present.

As seen in Fig. 23, a fuel tank 168 may be incorporated within one of the triangular prism structures at the rear end of the framework, thus adhering to the conventional disposal of this element in present day structures.

By the incorporation of one torsion resisting unit comprising the members 55, 56, 57, 58, 59, 63, 64, 65 and 66 in the front structure and the torsion resisting unit comprising the members 71, 72, 73, 74, 75, 78, 79, 80 and 81 in the rear structure, both structures become torsionally rigid in and of themselves and when coupled together at the panel points 50 and 60, the top corners of the framework which defines the rectangular windshield opening, which are the panel points 140 and 141, are prevented from shifting laterally, that is, in a horizontal plane. In this manner a rectangular windshield opening may be provided without the provision of any diagonals extendng thereacross.

The torsion resisting units need not necessarily be located as shown in the disclosure herein, but may be placed anywhere in the front and rear structures as desired.

The type of construction herein described may be equally well applied to four-door sedans, coupes and the like, as well as railway cars, boats, airplanes, and other vehicles.

Although but one specific embodiment and one modification of this invention have been herein shown and described, it is to be understood that numerous details of these constructions may be altered or omitted without departing from the spirit of the invention as defined by the following claims.

We claim:

1. In a vehicle body frame construction, a triangular plane element the three corners of which constitute connecting panel points on one side of the vehicle body frame, and three members extending transversely to the plane of said element, connecting the panel point corners of said element to a panel point on another side of said vehicle body frame distantly removed from the plane of said element, said three members forming a statically determinate structure of triangular pyramidal shape having the apex thereof terminating at said distantly removed panel point for determinately fixing said point in space relatively to said element.

2. In a vehicle body frame construction, a space unit comprising a vertically disposed base panel adapted to extend transversely of the body frame and terminating at opposite sides thereof, a vertically disposed, triangular shaped side panel having its base end on one end of said base panel and a diagonal brace member connecting the apex of said side panel to the opposite end of said base panel.

3. In a vehicle body frame construction, a space unit comprising a substantially rectangular base panel adapted to extend transversely of the body frame, triangular side panels on said base panel and a diagonal brace member connecting the apex of one of said side panels to the distant end of said base panel.

4. In a vehicle body frame construction, a space unit comprising a substantially rectangular statically determinate base panel adapted to extend transversely of the body frame and terminating at opposite sides thereof, side panels each having one end mounted on opposite ends of said base panel, and diagonal brace members connecting the respectively opposite ends of said side panels to said base panel.

5. In a vehicle body frame construction, a space unit comprising a base panel adapted to extend transversely of the body frame, a pair of triangular side panels disposed in spaced relation in substantially parallel registry with each other, with their respective bases on opposite ends of said base panel, a diagonal brace member connecting the apex of one of said side panels to the distant end of said base panel at the opposite side of the body frame, and a member connecting the apexes of said side panels to each other.

6. In a vehicle body frame construction, a torsionally braced space unit comprising a base panel adapted to extend transversely of the body frame and terminating at opposite sides thereof, a pair of side panels each having one end on respectively opposite ends of said base panel, said side panels being disposed in spaced substantially parallel relation and trusses connecting the respective opposite end of each of said side panels to the respectively distant end of said base panel at the opposite side of the body frame.

7. In a vehicle body frame construction, a torsionally braced space unit comprising a base panel adapted to extend transversely of the body frame and terminating at opposite sides thereof, a pair of side panels each having one end on respectively opposite ends of said base panel, said side panels being disposed in spaced substantially parallel relation and trusses connecting the respectively opposite end of each of said side panels to the respectively distant end of said base panel at the opposite side of the body frame, said trusses being joined to each other intermediate their ends.

8. In a vehicle body frame construction, a torsionally braced space unit comprising a vertically disposed base panel adapted to extend transversely of the body frame, a pair of vertically disposed side panels one on each end of said base panel, said side panels being disposed in spaced substantially parallel relation and king post trusses connecting the respectively opposite end of each of said side panels to the respectively opposite end of said base panel, said king post trusses being disposed in intersecting vertical planes.

9. In a vehicle body frame construction, a statically determinate space unit comprising a pair of triangular side panels disposed in spaced relation in substantially parallel registry with each other, members connecting the corners of one of said panels with the corresponding corners of the other of said panels, a brace member connecting one of the base corners of one of said panels to the opposite base corner of the other of said panels, and king post trusses connecting the apexes of said side panels with the respectively opposite bases of said panels, said trusses using a common king post.

10. In a vehicle body frame construction, a front structure having an upstanding end and extending downwardly at the front end and rearwardly along the floor, a rear structure having an upstanding end and extending downwardly at the back and forwardly along the floor, each of said structures being rigid in a longitudinal vertical plane, the rearwardly extending end of said front structure being connected to the forwardly extending end of said rear structure, and a compression member extending along the roof of said body for connecting the upstanding ends of said front and rear structures.

11. In a vehicle body frame construction, a statically determinate front structure having an upstanding end and extending downwardly at the front end and rearwardly along the floor, a statically determinate rear structure having an upstanding end and extending downwardly at the back and forwardly along the floor, the rearwardly extending end of said front structure being connected to the forwardly extending end of said rear structure, and a compression member extending along the roof of said body for connecting the upstanding ends of said front and rear structures.

12. In a vehicle body frame construction, a statically determinate torsionally rigid front structure having an upstanding end and extending downwardly at the front end and rearwardly along the floor, a statically determinate torsionally rigid rear structure having an upstanding end and extending downwardly at the back and forwardly along the floor, each of said structures being determinate in a longitudinal vertical plane, the rearwardly extending end of said front structure being connected to the forwardly extending end of said rear structure, and a compression member extending along the roof of said body for connecting the upstanding ends of said front and rear structure.

13. In a vehicle body frame construction, a front truss structure having an upstanding end and extending downwardly along the windshield, dash and cowl and rearwardly along the floor, a rear truss structure having an upstanding end and extending downwardly along the back and forwardly along the floor, the rearwardly extending end of the front structure being joined to the forwardly extending end of the rear structure, and compression members forming a structure extending along the roof of said body for joining the upstanding ends of said structures.

14. In a vehicle body frame construction, a front structure having an upstandng end and extending downwardly at the front end and rearwardly along the floor, a rear structure having an upstanding end and extending downwardly at the back and forwardly along the floor, each of said structures being statically rigid in a longitudinal vertical plane, the rearwardly extending end of said front structure being connected to the forwardly extending end of said rear structure, and compression members forming a structure extending along the roof of said body for connecting the upstanding ends of said front and rear structures, said roof structure being statically determinate in its own plane.

15. In a vehicle body frame construction, having a substantially rectangular windshield opening, a torsionally rigid front structure having an upstanding end and extending from the lower boundary of the windshield, downwardly and rearwardly along the floor, a torsionally rigid rear structure having an upstanding end and extending downwardly at the back and forwardly along the floor, the rearwardly extending end of said front structure being connected to the forwardly extending end of said rear structure, roof compression members extending from the upstanding end of said rear structure forwardly to the upper boundary of said windshield, and braces, rigid in a longitudinally vertical plane, connecting the forward ends of said roof compression members to the upstanding end of said front structure.

16. In a vehicle body frame construction having spaced panel points on opposite sides thereof, a torsionally rigid unit comprising a pair of vertically positioned transversely disposed intersecting coplanar members joined intermediate their ends, each of said members being determinate in its own plane, the opposite ends of said members joining said panel points on opposite sides of said frame.

17. In a vehicle body frame construction, a torsionally rigid unit comprising a pair of transversely disposed intersecting coplanar members joined intermediate their ends, each of said members being determinate in its own plane, both ends of one of said members being joined to the corresponding adjacent ends of the other by triangular coplanar panels respectively, and one end of one of said members being joined to the opposite end of the other of said members by one side of a rectangular diagonally braced panel.

18. In a vehicle body frame construction, a plurality of members joined to form a generally rectangular outer frame, a plurality of triangular panels having their respective apexes joined to the respective corners of said outer frame, the bases of said panels being joined to each other at their corners and forming a rectangular inner frame.

19. In a vehicle body frame construction, a series of statically determinate triangular space units, one side of each unit forming one side of the next succeeding unit, said series of units having an upwardly extending end and extending downwardly at the front of said body, rearwardly along the floor thereof, and terminating in a rearwardly extending apex, a second series of statically determinate triangular space units, one side of each unit forming one side of the next succeeding unit, said second series of units having an upwardly extending end and extending downwardly at the rear end of said body, forwardly along the floor thereof, and terminating in a forwardly extending apex, said apexes being connected together, and a series of roof compression members joining the upwardly extending ends of said two series of units.

20. In a vehicle body frame construction, a front truss structure having an upstanding end and extending downwardly along the windshield, dash and cowl and rearwardly along the floor, a rear truss structure having an upstanding end and extending downwardly along the back and forwardly along the floor, the rearwardly extending end of the front structure being joined to the forwardly extending end of the rear structure, compression members forming a structure extending along the roof of said body for joining the upstanding ends of said structures, and a torsionally rigid unit in each of said structures.

21. In a vehicle body frame construction, a statically determinate torsionally rigid unit providing four panel points in generally horizontal rectangular relationship, a pair of upwardly extending inverted triangular panels having their apexes joined to said unit at its two rear panel points respectively, a brace member joining the two rear base corners of said panels, a pair of substantially horizontal triangular panels having their bases joined to the bases of said upwardly extending inverted panels and their apexes joined together, brace members connecting said joined apexes to the two front panel points of said unit, and brace members connecting the front base corners of said upwardly extending inverted panels to the two front panel points of said unit respectively.

22. In a motor vehicle frame construction, an engine mounting comprising a plurality of members joined to form a statically determinate structure disposed in transverse vertical position with respect to the vehicle, and two groups of three members each, extending forwardly along each side respectively of the engine, each group forming a statically determinate space structure of triangular pyramidal shape, with the apex of each forming an engine supporting mounting.

23. In a motor vehicle frame construction, an engine mounting comprising a plurality of members joined to form a statically determinate structure disposed in transverse vertical position with respect to the vehicle, and two groups of three members each, extending forwardly along each side respectively of the engine, each group forming a statically determinate space structure of triangular pyramidal shape, with the apex of each forming an engine supporting mounting, the bases of said pyramidal space units being connected to each other and forming a third engine supporting mounting.

24. In a vehicle body frame construction, a cowl structure comprising a pair of substantially vertically disposed side panels on opposite sides of the body frame and providing at least three panel points on each, and two groups of three members each extending from the respective side panel points to a common point intermediate and at the top of the cowl structure, said intermediate point being determinately fixed by said members with respect to the panel points of said side panels.

25. In a vehicle body frame construction, a cowl structure comprising a pair of substantially vertically, longitudinally disposed side panels on opposite sides of the body frame, each providing two panel points at the upper end thereof, and two groups of two members each extending from the respective top panel points of the side panels to a common panel point intermediate the side panels, and means for joining said common panel point to the lower ends of said side panels.

26. In a vehicle body frame construction, a space unit comprising a vertically disposed base panel adapted to extend transversely of the body frame and terminating at opposite sides thereof, a pair of vertically disposed triangular side panels disposed in spaced relation in substantially parallel registry with each other, with their respective bases on opposite ends of said base panel, a diagonal brace member connecting the apex of one of said side panels to the end of said base panel at the opposite side of the body frame, and a second brace member connecting the apex of the other of said side panels to the said base panel at the opposite side of the body frame.

27. In a vehicle body frame construction, a space unit comprising a statically determinate base panel adapted to extend transversely of the body frame, a pair of triangular side panels disposed in spaced relation in substantially parallel registry with each other, with their respective bases on opposite ends of said base panel, a diagonal brace member connecting the apex of one of said side panels to the distant end of said base panel at the opposite side of the body frame, and a second brace member connecting the apex of the other of said side panels to the base panel at the opposite side of the body frame.

28. In a vehicle body frame, a plurality of panel points on each side thereof defining substantially rectangular door frames, and a plurality of members joined to form a statically determinate space structure for connecting the door frame panel points on one of the said sides to each other and to the door frame panel points on the other of said sides for determinately preventing the displacement of the door frame panel points of one door frame relatively to each other and relatively to the door frame panel points on the opposite side of the body frame.

LOWELL C. FREEMAN.
ANDREW P. BUESCH.